US012521585B2

(12) United States Patent
Schade

(10) Patent No.: US 12,521,585 B2
(45) Date of Patent: Jan. 13, 2026

(54) TRIGGERING ELEMENT FOR A FIRE PROTECTION SYSTEM, FIRE PROTECTION ELEMENT EQUIPPED THEREWITH, AND METHOD FOR DETECTING THE TRIGGERING OF A FIRE PROTECTION ELEMENT

(71) Applicant: FRAUNHOFER-GESELLSCHAFT ZUR FÖRDERUNG DER ANGEWANDTEN FORSCHUNG E.V., Munich (DE)

(72) Inventor: Wolfgang Schade, Goslar (DE)

(73) Assignee: Fraunhofer-Gesellschaft zur Förderung der angewandten Forschung e.V., Munich (DE)

(*) Notice: Subject to any disclaimer, the term of this patent is extended or adjusted under 35 U.S.C. 154(b) by 808 days.

(21) Appl. No.: 17/779,807

(22) PCT Filed: Nov. 26, 2019

(86) PCT No.: PCT/EP2019/082558
§ 371 (c)(1),
(2) Date: May 25, 2022

(87) PCT Pub. No.: WO2021/104609
PCT Pub. Date: Jun. 3, 2021

(65) Prior Publication Data
US 2023/0030385 A1 Feb. 2, 2023

(51) Int. Cl.
*A62C 37/14* (2006.01)

(52) U.S. Cl.
CPC .................................... *A62C 37/14* (2013.01)

(58) Field of Classification Search
CPC ......... A62C 37/10; A62C 37/11; A62C 37/14; A62C 37/40; A62C 35/68; A62C 35/60; A62C 35/62; A62C 35/64; A62C 3/16; G02B 6/02; G02B 6/021; G02B 35/3058
See application file for complete search history.

(56) References Cited

U.S. PATENT DOCUMENTS

| | | | | |
|---|---|---|---|---|
| 2003/0075343 A1* | 4/2003 | Ballard | .................. | A62C 3/004 169/37 |
| 2021/0141173 A1* | 5/2021 | Schade | ................ | G02B 6/0229 |

FOREIGN PATENT DOCUMENTS

| | | | |
|---|---|---|---|
| CH | 679895 * | 12/1989 | ............. A62C 37/14 |
| DE | 23 36 682 B1 | 7/1974 | |
| DE | 2336682 * | 7/1974 | ........... A62C 35/605 |

(Continued)

OTHER PUBLICATIONS

International Search Report with English Translation, dated Jul. 9, 2020, pp. 1-4, issued in International Application No. PCT /EP2019/082558, European Patent Office, Rijswijk, The Netherlands.

*Primary Examiner* — Christopher R Dandridge
(74) *Attorney, Agent, or Firm* — Hussey IP, LLC

(57) ABSTRACT

A triggering element for a fire protection system may be provided, the triggering element comprising at least one rupture body, which includes an optical waveguide, into which optical waveguide at least one predetermined breaking point is introduced. A sprinkler head or a smoke evacuation damper having at least one triggering element of this type may be provided. A method may be provided for detecting the triggering of a sprinkler head or of a smoke evacuation damper of a fire protection system.

17 Claims, 3 Drawing Sheets

(56) References Cited

FOREIGN PATENT DOCUMENTS

| | | | | |
|---|---|---|---|---|
| DE | 38 083 84 | A1 | 1/1989 | |
| DE | 10 2004 021 681 | B3 | 11/2005 | |
| DE | 19549868 | A1 * | 5/2008 | ........... G02B 6/2713 |
| DE | 102014201031 | A1 * | 7/2015 | ........ H01M 10/0525 |
| WO | WO 2019/185156 | A1 | 10/2019 | |

* cited by examiner

TRIGGERING ELEMENT FOR A FIRE PROTECTION SYSTEM, FIRE PROTECTION ELEMENT EQUIPPED THEREWITH, AND METHOD FOR DETECTING THE TRIGGERING OF A FIRE PROTECTION ELEMENT

CROSS-REFERENCE TO RELATED APPLICATIONS

This application is a 371 nationalization of international patent application PCT/EP2019/082558 filed Nov. 26, 2019. The entire contents of the above-identified application are hereby incorporated by reference.

DETAILED DESCRIPTION

Figure 1:
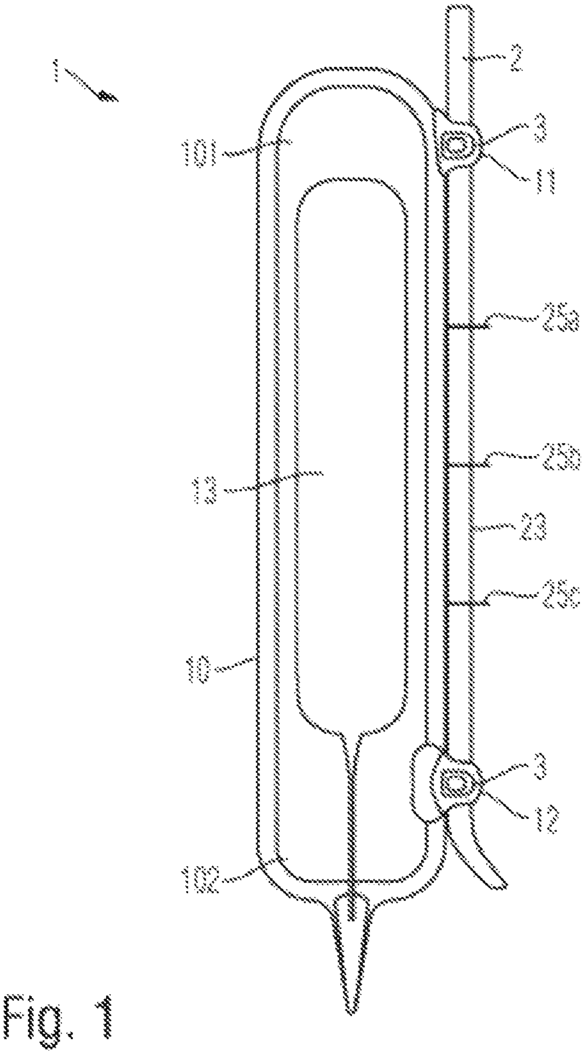
FIG. 1 shows a longitudinal section of a triggering element according to the present invention.

The invention relates to a triggering element for a fire protection system having at least one rupture body. The invention also relates to a fire protection element, for example a sprinkler head or a smoke evacuation damper having at least one such triggering element, a fire protection system having a plurality of fire protection elements, as well as a method for identifying the triggering of a sprinkler head or a smoke evacuation damper.

Such a triggering element for sprinklers is known from DE 3808384 A1. The known triggering element consists of a rupture body in the form of a cylindrical tube, the ends of which are each fused to form a plug. The tube is filled with a liquid which expands when heated and causes the tube to burst. This opens the valve of the sprinkler, allowing extinguishing water to escape. Sprinkler systems of this type can have a plurality of sprinkler heads in larger buildings.

These known sprinklers have the disadvantage that in larger buildings the location of the triggering can often only be determined inadequately. On the one hand, this means that the fire fighters must first locate the source of the fire within the building before the firefighting work can begin. In the case of a false triggering, considerable amounts of water can escape and cause great damage before the location of the triggering and the fact of a false triggering have been identified. In the event of the false triggering of a smoke evacuation damper, precipitation water can enter unnoticed and cause damage to buildings.

Based on the prior art, the object of the invention is thus to provide a fire protection system and its parts which allow easy localization of a triggered element.

According to one embodiment of the invention, a triggering element for a fire protection element of a fire protection system is proposed, which has at least one rupture body. The fire protection element proposed according to the invention can be, for example, a smoke evacuation damper and/or a sprinkler head. In some embodiments of the invention, the triggering element can contain a rupture body that can have a basic cylindrical shape with a cavity that is filled with a liquid. In addition to the liquid, an air or gas bubble can be present in the cavity which bubble can compensate for temperature-related volume fluctuations of the liquid below the triggering temperature. However, when a predeterminable temperature is exceeded, the liquid expands to such an extent that the rupture body bursts and triggers the fire protection element.

The rupture body can be made of glass or plastic material. In some embodiments of the invention, different rupture bodies can be provided which have different triggering temperatures in order to adapt the fire protection system or its fire protection elements to the conditions of their place of use.

According to the invention, it is now proposed to mechanically connect the rupture body to at least one optical waveguide. In some embodiments of the invention, the optical waveguide can be a single-mode fiber, a few-mode fiber, or a multi-mode fiber. In some embodiments of the invention, the optical waveguide can be or contain a glass fiber. In other embodiments of the invention, the optical waveguide can be or contain a polymer fiber. In some embodiments of the invention, optical waveguides from telecommunications can be used, which are available at low cost in large quantities.

According to the invention, it is proposed to introduce at least one predetermined breaking point into the optical waveguide. The predetermined breaking point causes the optical waveguide to be reliably destroyed when the rupture body bursts. This results in optical signals propagating in the optical waveguide no longer being transmitted at this point. The absence of the optical signal can thus be detected as a triggering of the fire protection system. Provided that it is known which optical waveguide is installed at which location, or that the triggering elements have been otherwise coded, the location of the triggering of the fire protection system can be reliably determined.

In some embodiments of the invention, the optical waveguide contains a core and a cladding surrounding the core such that optical signals are totally reflected at the interface between the core and the cladding. In this case, the at least one predetermined breaking point can be introduced into the optical waveguide by damaging or weakening the cladding. As a result, the core and thus the optical properties of the optical waveguide remain unchanged. However, pre-damaging the optical waveguide ensures that it will be reliably destroyed if the rupture body bursts.

In some embodiments of the invention, such damage to the optical waveguide leading to a predetermined breaking point can be accomplished by mechanical processing, such as grinding. In other embodiments of the invention, the optical waveguide can be chemically damaged, for example by etching. In yet other embodiments of the invention, the predetermined breaking point can be created by laser material processing. In particular, material processing with a focused short pulse laser can be used for this purpose. By selecting the focal position, the pulse energy, the number of individual pulses and the pulse shape, the desired damage to the optical waveguide can be precisely controlled in terms of both location and extent.

In one embodiment of the invention, the optical waveguide can be attached to the rupture body by means of bonding or clamping at at least two locations. This ensures that, when the rupture body bursts, a sufficiently large mechanical stress is introduced into the optical waveguide so that it is reliably destroyed at at least one predetermined breaking point. Furthermore, the attachment by means of bonding or clamping allows the retrofitting of already installed fire protection systems without the need for an extensive new installation of the fire protection system. Since gluing on the optical waveguide leaves the rupture body as such unchanged, recertification of the fire protection system or the rupture body can be avoided. The fire protection system can perform all previous functions unchanged and is extended to include the function of the local detection of the location of the release.

In some embodiments of the invention, the optical waveguide can rest against the rupture body at least in a portion. This, on the one hand, increases the mechanical stress acting on the optical waveguide when the rupture body bursts. On the other hand, there is a high probability that the optical waveguide will be additionally damaged by shards or splinters of the rupture body. As a result, the identification probability and thus the reliability of the method proposed according to the invention can be increased.

In some embodiments of the invention, the optical waveguide can have between one and about ten predetermined breaking points over a length of about 5 mm to about 15 mm. The redundant insertion of a plurality of predetermined breaking points can ensure that the optical waveguide is reliably destroyed when the rupture body bursts.

In some embodiments of the invention, a predetermined breaking point can extend approximately perpendicular to the longitudinal direction of the optical waveguide. Provided that the optical waveguide runs approximately parallel to the longitudinal direction of the rupture body of the triggering element, it is reliably and completely severed at the predetermined breaking point.

In some embodiments of the invention, the optical waveguide can contain at least one fiber Bragg grating. The fiber Bragg grating contains a plurality of spatial regions or voxels that are at least partially introduced into the core of the optical waveguide and that have a refractive index which is different from the refractive index of the surrounding material of the core. The spacing of adjacent spatial regions or voxels defines the grating constant of the fiber Bragg grating. A fiber Bragg grating of this type has the effect that light of a predeterminable wavelength defined by the grating constant is reflected, whereas light of a different wavelength is transmitted. The fiber Bragg grating can thus be used to reflect an optical signal coupled into the optical waveguide. As a result, the transmitter and the receiver of the optical signal can be arranged at one end of the optical waveguide so that the complexity of the device according to the invention is reduced. If fiber Bragg gratings with different grating constants are used for triggering elements or sprinkler heads or also evacuation dampers at different locations, different locations can be distinguished by wavelength multiplexing. Alternatively or additionally, different locations can be distinguished by the propagation time of a pulsed optical signal. In this way, the complexity can be further reduced since an optical waveguide does not have to be run from each element of the fire protection system to the fire alarm center of the building. This results in installation advantages in particular in the renovation of old buildings.

In some embodiments of the invention, the fiber Bragg grating can be a chirped fiber Bragg grating. In such a chirped fiber Bragg grating, the grating constant changes along the longitudinal extension of the fiber Bragg grating. As a result, the fiber Bragg grating reflects a wider range of wavelengths, allowing reliable reflection and thus a reliable identification without false alarms even in the presence of thermal drifts in the wavelengths of the optical signals.

In some embodiments of the invention, a plurality of optical waveguides can each be coupled to a central optical waveguide via a fusion coupler or another 3 dB coupler known per se. The plurality of optical waveguides can be coupled between 2 and about 35 or between about 2 and about 50. As a result, all of the sprinklers or smoke evacuation dampers in a fire section or floor can be connected to the fire alarm system of a building using a single central optical waveguide.

In some embodiments of the invention, the central optical waveguide can be connected to a spectrometer at one end, for example, in a fire alarm center. A spectrometer can be designed as an integrated optical component, such as an AWG. In some embodiments of the invention, the spectrometer can be integrated into the central optical waveguide by containing at one end at least one chirped fiber Bragg grating configured to direct light to an optoelectronic semiconductor device. In some embodiments of the invention, at least a portion of the chirped fiber Bragg grating can be provided with additional scattering centers. This can eliminate the need for an external spectrometer. Rather, light is coupled out laterally from the central optical waveguide, i.e. approximately orthogonally to its longitudinal extension. In this process, light of different wavelengths is imaged at different locations so that by using a spatially resolving detector, for example a photodiode array or a CCD line sensor, the light intensity in different wavelengths or wavelength ranges can be detected. Provided that the different triggering elements have been provided with optical waveguides having different fiber Bragg gratings, individual pixels or pixel groups of a CCD line sensor or individual diodes of a photodiode array can be directly assigned to a triggering element of the fire protection system to be monitored. In this way, the location of the triggering of a sprinkler or the installation location of a smoke evacuation damper can be easily determined and visualized, for example by means of a database or a conversion table.

The invention will be explained in more detail below by means of drawings without limiting the general concept of the invention.

An exemplary embodiment of a triggering element 1 for a fire protection system is explained on the basis of FIG. 1. The triggering element can be used, for example, to trigger a sprinkler or a smoke evacuation damper in the event of a fire.

For this purpose, the triggering element 1 contains a rupture body 10, which can be made of glass or a plastic material, for example. The rupture body 10 has a roughly cylindrical basic shape, comprising a first end 101 and an opposite second end 102. The cross-section of the rupture body 10 can be polygonal or, in particular, round. The rupture body 10 contains a cavity 13 filled with a liquid and optionally an air or gas bubble. When the rupture body 10 and the enclosed liquid are heated, the liquid expands and, with increasing internal pressure, generates a mechanical stress on the material of the rupture body 10, which finally, with sufficient heating leads to the bursting of the rupture body 10. The geometry of the rupture body 10 and/or the enclosed amount of liquid and/or the composition can be selected in such a way that different rupture bodies with different triggering temperatures can be provided so that, depending on the requirements of the fire protection system, different triggering temperatures can be selected for the elements combined in the fire protection system, such as sprinklers or smoke evacuation dampers.

The sprinkler or the smoke evaporation damper is designed in such a way that, for example, a spring-loaded valve or a valve pressurized by water is held in a closed position by the rupture body 10. After the bursting of the rupture body 10, the valve is opened so that extinguishing water can escape from a sprinkler head.

In known fire protection systems, the triggering of a sprinkler can only be inadequately identified. If monitoring is provided at all, it is usually the pressure drop in the water pipe that follows the triggering that is detected. In particular in the case of large installations in larger buildings, the fire fighters are therefore often unable to move quickly to the source of the fire because the location of the source of the fire that led to the sprinkler being triggered is not known. In the event of a sprinkler being triggered incorrectly, large amounts of damage can often be caused by escaping extinguishing water, and the faster the sprinkler can be found and the flow of water stopped, the less damage can be caused. Thus, it is desirable to monitor the triggering elements of a fire protection system so that triggering can be identified quickly and the location of the triggered triggering element within a building can be detected quickly.

To this end, it is proposed according to the invention to attach an optical waveguide 2 to the rupture body 10. According to the invention, it is proposed in some embodiments to attach the optical waveguide to the rupture body 10 by means of one or two bonds 3. Alternatively or additionally, it is also possible to use a clamping device (not shown) in order to attach the optical waveguide 2 to the rupture body 10. In this case, the optical waveguide 2 can run along the longitudinal extension of the rupture body 10 and be fastened in such a way that it at least partially rests against the rupture body 10, at least in a portion 23. The optical waveguide 2 can be designed to reflect incoming light and to reflect it back in the direction of incidence. This can be done, for example, by a mirrored end or by a fiber Bragg grating. The end of the optical waveguide which is not shown in the drawing can be routed, for example, to a fire alarm center. It is there that an optical signal can be coupled into the optical waveguide 2 and reflected at the end located at the triggering element. As long as the reflected signal is detected in the fire alarm center, the triggering element is intact. When the rupture body 10 is destroyed, the optical waveguide 2 is also damaged so that the reflected signal is no longer detected in the fire alarm center. For this purpose, the optical waveguide 2 includes at least one predetermined breaking point 25. In the illustrated exemplary embodiment, three predetermined breaking points **25*a*, 25*b* and 25*c* are shown. In some embodiments of the invention, the optical waveguide 2 can have between one and about ten predetermined breaking points 25** over a length of about 5 mm to about 15 mm.

Provided each triggering element is equipped with an optical waveguide, the location of the respective triggering element or sprinkler provided therewith can be determined from the respective associated optical waveguide. When multiple optical waveguides are coupled to a central optical waveguide, as described below, the location of the respective triggering element can be determined by the propagation time of a pulsed optical signal. In other embodiments of the invention, fiber Bragg gratings of different triggering elements can have a different grating constant. This results in a different wavelength range of a broadband optical signal being reflected in each case. Thus, different triggering elements can be distinguished from one another in the wavelength multiplex.

Figure 2:
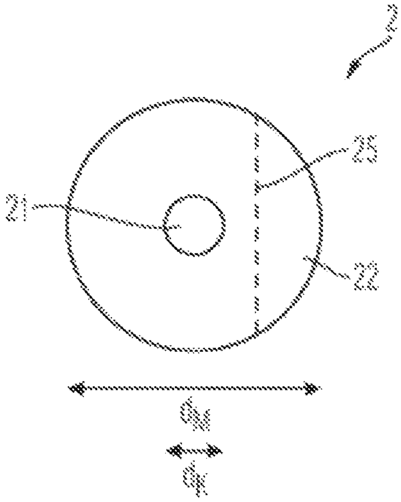
FIG. 2 shows a cross-section through an optical waveguide used according to the invention.

FIG. 2 shows a cross-section through an optical waveguide 2 as it can be used for the above invention. As is clear from FIG. 2, the optical waveguide 2 has a core 21 and a cladding 22 surrounding the core. The core has a core diameter $d_k$ which can be between about 5 μm and about 80 μm. The cladding has a cladding diameter $d_m$, which can be between about 80 μm and about 250 μm.

Core 21 and cladding 22 can be made of glass or a plastic material. The core and cladding have different refractive indices, so that a signal propagating in the core 21 is totally reflected at the interface between core and cladding and, as a result, propagates along the optical waveguide 2.

As is also clear from FIG. 2, a predetermined breaking point 25 has been created by processing material with a short pulse laser. The short pulse laser can have a pulse duration of less than 250 fs and/or a pulse energy of greater than 500 nJ at a wavelength of about 800 nm. The pulse repetition rate can be between about 50 MHz and about 120 MHz. The interaction of the material of the cladding 22 with the intense laser radiation produces damage to the material of the cladding and thus a reduction in the mechanical stability of the optical waveguide 2. This creates a predetermined breaking point in the optical waveguide 2 at this location. By selecting the focal position of the laser radiation used to create the predetermined breaking point 25, the position of the predetermined breaking point 25 can be precisely controlled. As shown in FIG. 2, the predetermined breaking point 25 is located exclusively in the cladding 22 so that the optical properties for the optical signals propagating in the core 21 remain unaffected.

In the same way as described above for a predetermined breaking point 25, fiber Bragg gratings can be generated in the core 21 by point-to-point exposure of individual spatial regions or voxels.

Figure 3:
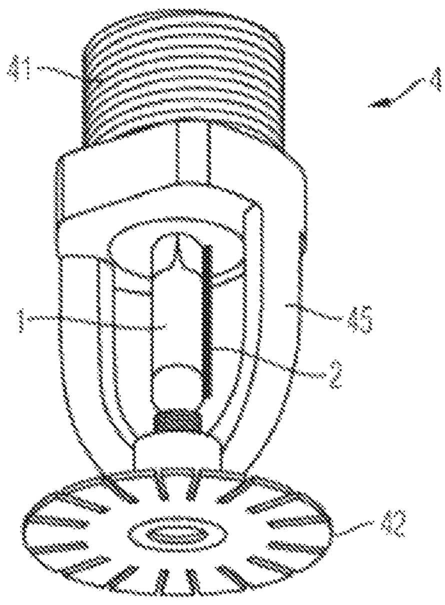
FIG. 3 shows a sprinkler head according to the invention.

A sprinkler head according to the present invention is explained on the basis of FIG. 3. The sprinkler head 4 has a thread 41 at one end by means of which it can be connected to a pipeline. An extinguishing agent, for example water, flows in the pipeline to the sprinkler head.

The sprinkler head 4 has a valve, not visible in FIG. 3, which keeps the sprinkler head 4 closed during normal operation and thus prevents water from escaping. The valve of the sprinkler head 4 is held closed by a triggering element 1, which has been explained in more detail on the basis of FIG. 1 described above. The triggering element 1 is clamped to the sprinkler head 4 by a bracket 45, so that it can exert a closing force on the valve. The end of the bracket 45 can accommodate an optional plate 42 which distributes the escaping extinguishing agent when the sprinkler head 4 is in operation.

If the sprinkler head is exposed to a strong heat source, for example due to a fire, the triggering element 1 is destroyed, as described above. This releases the flow of extinguishing agent, so that the fire can be extinguished shortly after it starts and fire spread is prevented.

Simultaneously with the destruction of the triggering element 1, the optical waveguide 2, which runs parallel at least in portions, is destroyed so that the triggering of the sprinkler head 4 can be registered in a fire alarm center of the building.

Figure 4:
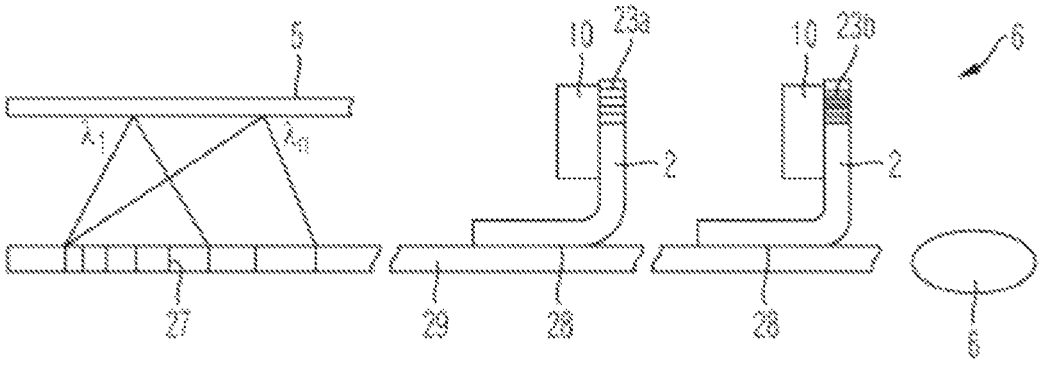
FIG. 4 shows a fire protection system according to the invention.

FIG. 4 shows a fire protection system 6 having a plurality of sprinkler heads and/or smoke evacuation dampers. For reasons of clarity, FIG. 4 only shows the rupture bodies 10 of two such sprinkler heads and/or smoke evacuation dampers. In some embodiments of the invention, there can be between about two and about 35 rupture bodies 10, each with associated optical waveguides 2.

The optical waveguides 2 are coupled to a central optical waveguide 29 via a 3 dB coupler, such as a fusion coupler 28. The central optical waveguide 29 leads from a fire alarm center to the last sprinkler to be monitored in the fire protection system 6. The 3 dB couplers 28 represent branch elements at which optical signals can be guided to the respective optical waveguide 2.

As is also explained in FIG. 4, the fire protection system contains at least one light source 6. The light source 6 can be, for example, an LED, a semiconductor laser, a superluminescent diode or another light source known per se. The light from the light source 6 is coupled into the central optical waveguide 29 and propagates along its longitudinal extension. At each of the 3 dB couplers 28, a portion of the light intensity propagating in the central optical waveguide 29 is transferred to the optical waveguides 2. The light propagates further in the optical waveguide 2 to the respective fiber Bragg grating 23 present there.

As shown schematically in FIG. 4, the fiber Bragg grating 23*a* of the first optical waveguide 2 has a different grating constant than the second fiber Bragg grating 23*b* of the second optical waveguide 2. As a result, a different wavelength or a different wavelength range is reflected at the fiber Bragg grating 23*a* and 23*b* in each case. The reflected portion is reflected back in the optical waveguide 2 in the direction of incidence. The transmitted portion can leave the optical waveguide 2 and be radiated into the environment.

The portion of the light reflected at the fiber Bragg grating 23 is transferred back into the central optical waveguide 29 via the 3 dB coupler 28 and thus enters a longitudinal portion in which a chirped fiber Bragg grating 27 is arranged. This fiber Bragg grating 27 causes the light to be coupled out to the side of the central optical waveguide 29, with light of a first wavelength $\lambda_1$ interfering at a different location than light of a wavelength $\lambda_n$ different therefrom. An optoelectronic semiconductor component 5 is used for the spatially resolved reception of the optical signals, for example by a photodiode array or a CCD line sensor or a CMOS sensor. Thus, the respective measurement location on the optoelectronic semiconductor component 5 can be used to infer the location of the optical waveguide 2 and thus of the respective sprinkler head 4 within the building.

If a multi-mode fiber having a core diameter of about 60 μm is used as the central optical waveguide 29, 32 or more measuring points or sprinkler heads 4 can easily be read out with a single central optical waveguide 29. In this case, there would be a dynamic range difference of 22.5 dB between the first and thirty-second measurement points along the longitudinal extension of the central optical waveguide 29. This dynamic range can easily be read out with common CCD line sensors, which provide a dynamic range of about 48 dB. In order to further increase sensitivity, the integration time of the optoelectronic semiconductor device 5 can be between about 0.1 second and about 5 seconds, or between about 1 second and about 5 seconds.

It should be noted that the fire protection system according to FIG. 4 should be understood as merely exemplary. Of course, instead of the chirped fiber Bragg grating 27, another spectrometer can also be used, such as an AWG or another design known per se.

Even though the light source 6 in FIG. 4 is drawn at the opposite end of the central optical waveguide 29, a person skilled in the art is of course familiar with the fact that the spectrometer or the chirped fiber Bragg grating 27 and the light source 6 can also be arranged at one and the same end of the central optical waveguide 29. This can reduce the complexity of the fire protection system and increase the operational reliability.

Figure 5:
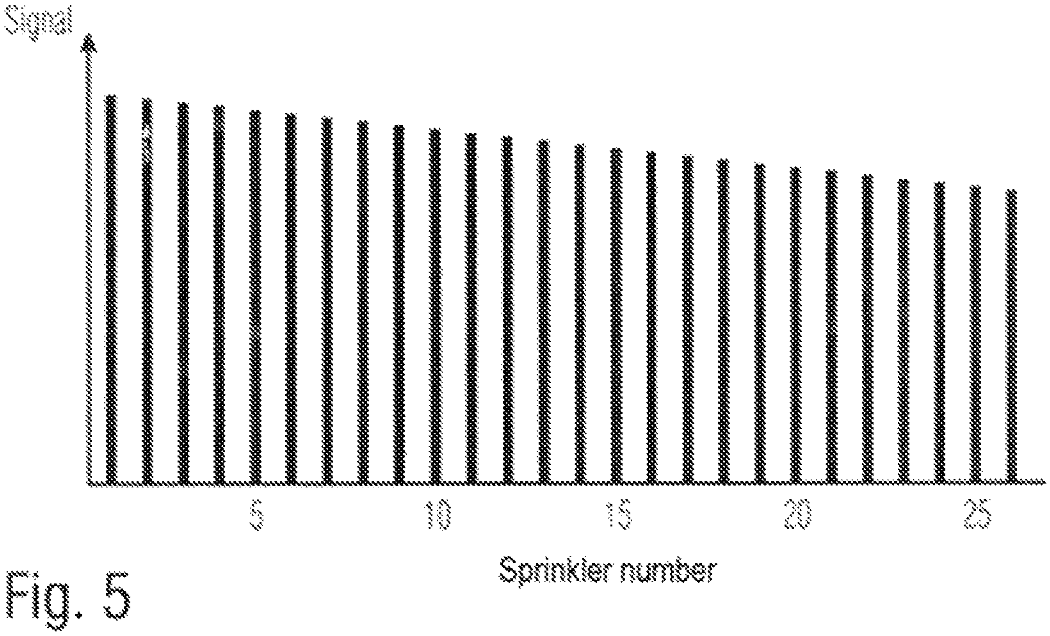
FIG. 5 shows an example of a measurement signal obtained according to the invention without triggering a sprinkler.
Figure 6:
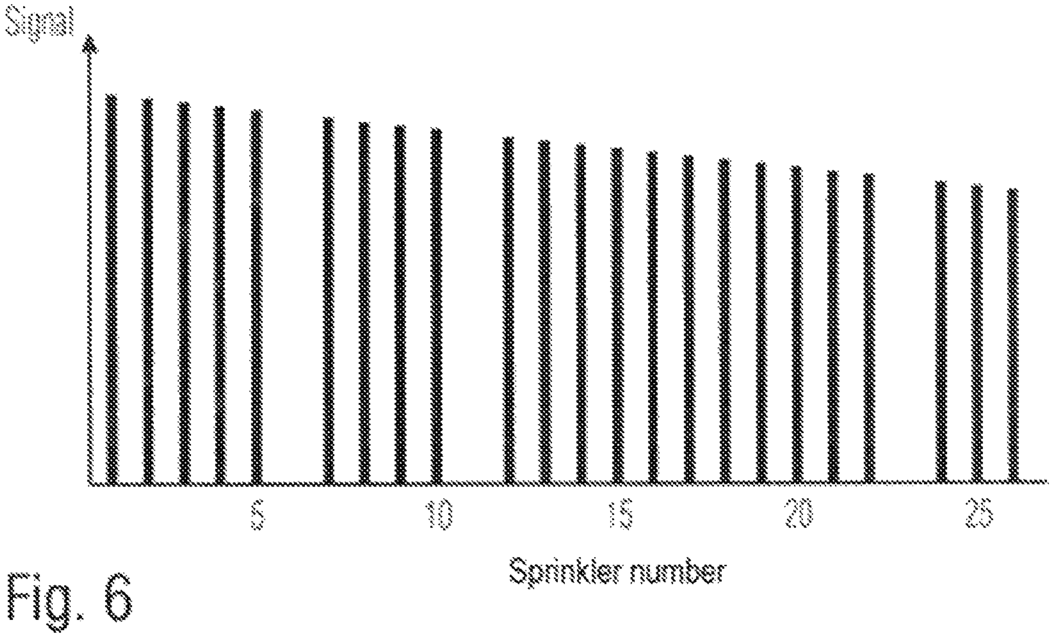
FIG. 6 shows an example of a measurement signal obtained according to the invention after three sprinklers have been triggered.

The operating principle of the fire protection system according to FIG. 4 is explained on the basis of FIGS. 5 and 6. The signal intensity is shown on the ordinate and the number of the respective sprinkler on the abscissa. Each sprinkler is coded by a fiber Bragg grating 23 as described above. The reflection maximum of each fiber Bragg grating can here have a half-value width of about 0.5 nm and can differ from the reflection maximum of other, in particular neighboring, fiber Bragg gratings. Thus, the location of the sprinkler can be directly deduced from the measurement location at the optoelectronic semiconductor component 5 behind the spectrometer.

FIG. 5 shows a fully functional fire protection system before it is triggered. It can be seen that a reflection maximum was obtained for each of the 26 sprinklers installed in the building as an example, as explained above on the basis of FIG. 4. Due to the signal attenuation along the central optical waveguide 29, the intensity decreases with increasing distance from the fire alarm center.

FIG. 6 shows the same measurement after sprinklers 6, 11 and 23 have been triggered, for example by a fire or false triggering. The triggering occurs by bursting of the rupture body 10, as a result of which the respective associated optical waveguides 2 are also destroyed at at least one predetermined breaking point 25. This results in the respective fiber Bragg grating 23 no longer being supplied with light and no longer being able to measure a reflection peak. The triggering of the sprinklers can thus be identified in a simple manner by setting a trigger threshold, which can also be selected relatively close above the zero line and thus renders possible a reliable identification without unnecessary false alarms.

Of course, the invention is not limited to the illustrated embodiments. Therefore, the above description should not be considered limiting but explanatory. The below claims should be understood such that a stated feature is present in at least one embodiment of the invention. This does not rule out the presence of further features. If the claims and the above description define "first" and "second" embodiments, this designation is used to distinguish between two similar embodiments without determining a ranking order.

To clarify the use of and to hereby provide notice to the public, the phrases "at least one of <A>, <B>, . . . and <N>" or "at least one of <A>, <B>, . . . or <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed. Unless otherwise indicated or the context suggests otherwise, as used herein, "a" or "an" means "at least one" or "one or more."

The invention claimed is:

1. A fire protection system comprising a plurality of sprinkler heads and/or a plurality of smoke evacuation dampers, each of the sprinkler heads and/or the smoke evacuation dampers including a triggering element, the triggering element including a rupture body, wherein the rupture body includes an optical waveguide having a predetermined breaking point, wherein the optical waveguide of the rupture body of the triggering element included in each of the sprinkler heads and/or the smoke evacuation dampers is optically coupled to a corresponding one of a plurality of optical waveguides that are optically coupled to a central optical waveguide via a 3 dB coupler in each case.

2. The fire protection system of claim 1, wherein the central optical waveguide is connected at one end to a spectrometer or includes a spectrometer.

3. The fire protection system of claim 2, wherein the spectrometer includes a chirped fiber Bragg grating, which is arranged at least partially in a core of the central optical waveguide and is configured to direct light onto an optoelectronic semiconductor component.

4. The triggering element of claim 1, wherein the rupture body is made of glass or a plastic material.

5. The triggering element of claim 1, wherein the rupture body has a hollow body and is at least partially filled with a liquid.

6. The triggering element of claim 1, wherein the optical waveguide is fastened to the rupture body at at least two points by means of bonding or clamping, and/or wherein the optical waveguide rests at least in a portion against the rupture body.

7. The triggering element of claim 1, wherein the optical waveguide has between one and about ten predetermined breaking points over a length of about 5 mm to about 15 mm.

8. The triggering element of claim 1, wherein the optical waveguide has a core and a cladding surrounding the core, and the cladding includes the predetermined breaking point.

9. The triggering element of claim 8, wherein the predetermined breaking point is obtainable by irradiating the cladding with a short pulse laser.

10. The triggering element of claim 8, wherein the predetermined breaking point runs approximately perpendicular to the longitudinal direction of the optical waveguide.

11. The triggering element of claim 1, wherein the optical waveguide includes a fiber Bragg grating.

12. The triggering element of claim 11, wherein the fiber Bragg grating is a chirped fiber Bragg grating.

13. A method for identifying a triggering of a sprinkler head or a smoke evacuation damper of a fire protection system comprising a triggering element including a rupture body, wherein the rupture body includes an optical waveguide having a predetermined breaking point is introduced, the method comprising detecting a breaking of the optical waveguide, wherein light from an LED or a superluminescent diode or a semiconductor laser is coupled into the optical waveguide to generate an optical signal, and the optical signal transmitted through the optical waveguide is detected.

14. The method of claim 13, wherein the optical waveguide comprises a fiber Bragg grating and wherein a triggering of the triggering element from a plurality of triggering elements of the fire protection system is detected by wavelength multiplexing and/or the propagation time of the optical signal.

15. The method of claim 13, wherein the optical waveguide has a core and a cladding surrounding the core, and the predetermined breaking point is arranged in the cladding.

16. The method of claim 13, wherein the location at which the triggering of the sprinkler head or the smoke evacuation damper was detected is visualized in a site plan.

17. A method for identifying the triggering of a sprinkler head or a smoke evacuation damper of a fire protection system comprising a triggering element including a rupture body, wherein the rupture body includes an optical waveguide having a predetermined breaking point, the method comprising detecting a breaking of the optical waveguide, wherein the optical waveguide comprises a fiber Bragg grating and wherein a triggering of the triggering element from a plurality of triggering elements of the fire protection system is detected by wavelength multiplexing and/or the propagation time of the optical signal.

* * * * *